Nov. 12, 1968  TOSHIHIKO SATAKE  3,410,286
METHOD FOR PREVENTING ADHESION OF FLOURY MATERIAL TO THE
SURFACE OF THE OTHER OBJECT
Filed July 6, 1965  4 Sheets-Sheet 1

INVENTOR.
Toshihiko SATAKE
BY McGlew and Toren
ATTORNEYS

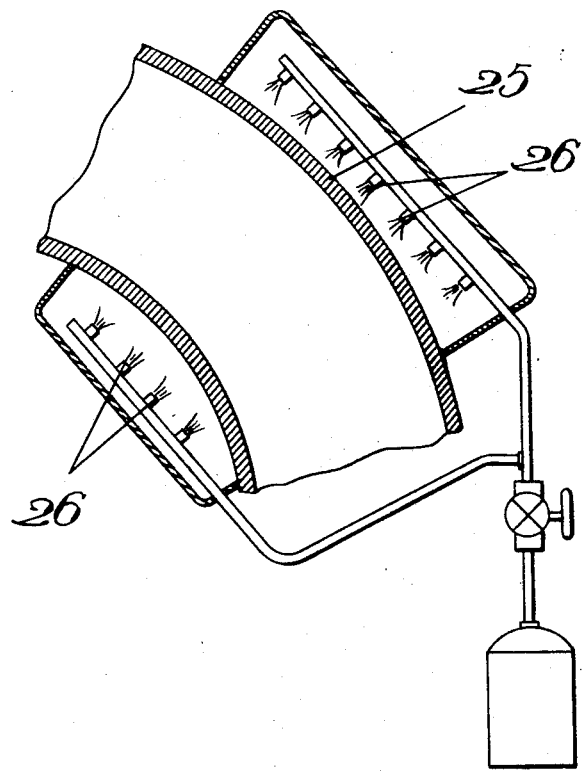

United States Patent Office 3,410,286
Patented Nov. 12, 1968

3,410,286
METHOD FOR PREVENTING ADHESION OF FLOURY MATERIAL TO THE SURFACE OF THE OTHER OBJECT
Toshihiko Satake, 2–687 Oaza Saijyo Higashi, Saijyo-cho, Kamo-gun, Japan
Filed July 6, 1965, Ser. No. 469,707
Claims priority, application Japan, July 15, 1964, 39/40,275
4 Claims. (Cl. 137—13)

ABSTRACT OF THE DISCLOSURE

A method of handling powdery and granular materials flowing through conveying means to prevent the adhesion of the flowing materials to the surfaces of the conveying means, comprised of the step of heating the surfaces of the conveying means in contact with the flowing materials to a temperature higher than the dew point of the water content of the flowing materials and lower than the temperature of degeneration of the materials. Further, the method includes the steps of maintaining the temperature of the contacting surfaces about 15° higher than the temperature of the material flowing through the conveying means, and thermostatically controlling the temperature of the contacting surfaces for maintaining the temperature thereof constant.

---

This invention relates to a method for preventing adhesion of floury material to the surface of the other object.

An object of the present invention is to provide a method for preventing adherence of floury material, such as wheat flour, to the interior surface of flow tube or valve to which floury material, when conveyed therethrough, may be contacted, and resulting hindrance of passage of floury material therethrough.

Another object of the present invention is to provide a method for preventing adherence of floury material, such as bran or wheat flour, to the interior surface of the other object to which floury material, when conveyed therethrough, may be contacted, accompanied with increased fluidity resistance of floury material conveyed and hindrance of smooth flow of floury material therethrough, and deterioration or putrefaction of floury material due to adhesion thereof to the surface of the other object. With these objects in view and other objects hereinafter set forth, the present invention will be described in the specification and the appended claims with reference to the drawing showing various embodiments of the present invention, in which:

FIG. 6 is a cross-section in side elevation of the corn transit line embodying the present invention.

The present invention is directed to the method for preventing adhesion of flour to the surface of the other object, characterized in that the surface of the latter is heated to a temperature at which floury material is not affixed to the solid surface.

In general, when flour is placed on or accommodated or circulated inside the solid surface, the temperature thereof being lower than that of flour and equal to or lower than the dew point of the vaporized water contents of flour, the latter will form dewdrops on the solid surface, causing the fine particles of flour to be affixed thereto.

It is common that floury material, such as bran, will adhere to the surface of the wall in which the floury material is conveyed and hinder the smooth flow of material therethrough, and this in general has caused a lot of trouble. The researches attempted for solving the problem has been abandoned in failure and the damage sustained has amounted to an enormous sum. For instance, the machines for treating corn or industrial medicines will often cause disorders if they are not broken up and remedied frequently. The waste of labor and cost and the damages due to the intermissions of operation are not to be overlooked.

The present invention is directed to the method for preventing the affixture of flour to the part of the object in contact with flour through heating that part of the object to a temperature higher than the dew point of vaporized water contents of flour.

This temperature may be 15° C. higher than that of the object to be treated but this temperature is not restricted thereto and any temperature not causing damages to the floury substance may also be available.

The heating means utilized may be anything such as electrical heating, hot air or the like. If a thermostat is used, the temperature may be kept constant.

The present invention is effective to maintain the surface of the solid surface clean through keeping floury material from adhering to the solid surface.

The present invention will now be described with reference to the drawings, wherein the same parts are indicated by the same reference marks.

Figure 1:
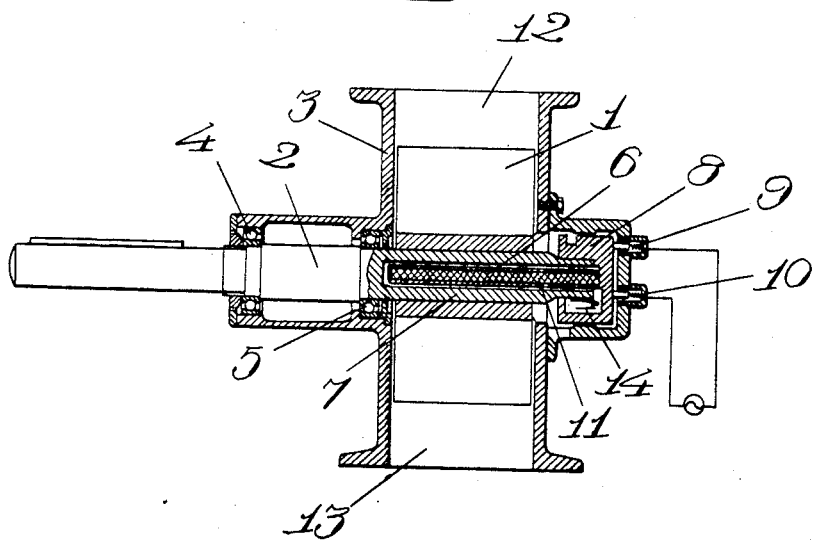
FIG. 1 is a cross-section in side elevation of the rotary valve, embodying the present invention, for conveyance of floury substance therethrough.
Figure 2:
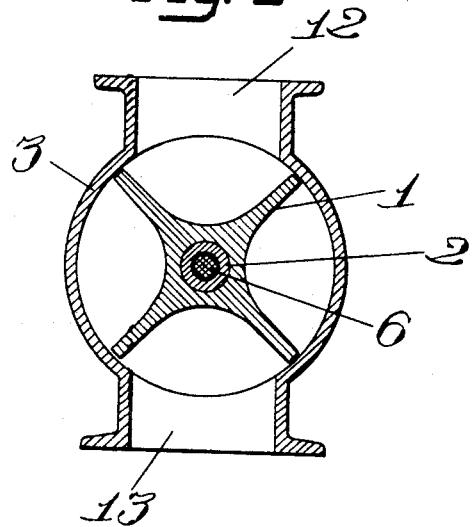
FIG. 2 is a front section thereof.

In FIGS. 1 and 2, wherein rotary valve for conveyance of floury material is illustrated, 1 is a rotary valve, 2 is a rotary axis thereof, 3 is a wall surface equipped with rotary valve, 1, 4 and 5 are bearing members for rotary axis 2, 6 is an electric heater tube inserted freely rotatably inside tubular member 7, 8 is an insulator, 9 and 10 are terminals of electric heater 11, 12 is an inlet for floury material, 13 is an outlet for floury material and 14 is a thermostat for adjusting the heating temperature. As the electric heater tube 6 installed inside the rotary valve is not rotated with the rotation of valve 1, the surface of the latter may be heated to a suitable temperature, and, with the use of the thermostat, the temperature may always be kept at a constant temperature. In this way, the deficiency of the rotary valve, the floury material will stick to the surface thereof and has to be shaken off so very frequently, is now removed completely.

Figure 3:
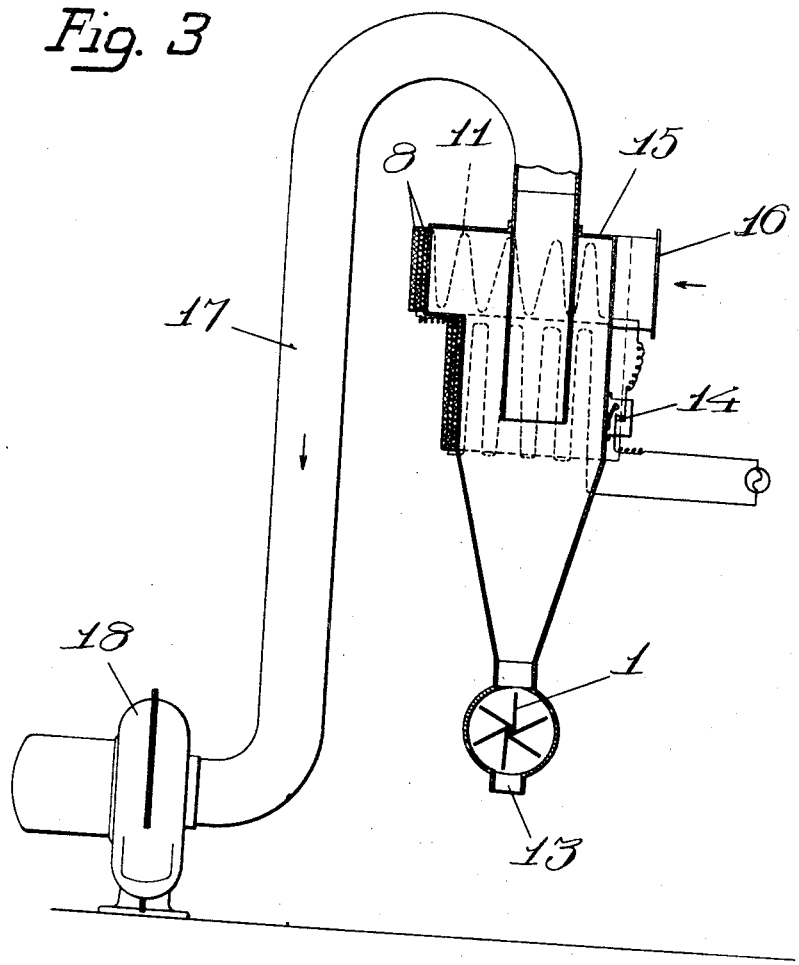
FIG. 3 is a cross-section in side elevation of the cyclone bran collector, embodying the present invention.

In FIG. 3, wherein cyclone bran collector embodying the present invention is illustrated, 15 is a bran collector body having the peripheral surface thereof encircled partially or wholly with electric heater 11 to keep the temperature on the inner wall surface of the bran collector proper 1 at a constant level and prevent the affixture of bran thereto. In general, the temperature of the bran produced through the threshing machine is considerably elevated, so that the water contents vaporized from the surface of the bran will form dewdrops when contacted to the inner wall surface of the cyclone bran collector which is below the dew point of the vaporized water contents of bran, and the bran will easily stick to the dewdrops, forming a moist layer of bran on the collector surface. Once the first layer of bran is formed, more bran may be stuck to the first layer and the thickness of the layers forming on the inner wall surface of the collector will increase rapidly. Since the fats contained in the layers are condensed even if the water contents are evaporated, a thick layer is formed on the inner surface of the collector which may increase the air resistance inside the collector to a considerable extent, and separation of bran from the forced air is rendered difficult. Moreover, the high water contents contained in the dusty flour are liquefied because of the temperature of the surface of the collector which is much below the dew point, and bran dissolved in the water drops, forms a thick layer of condensed bran. These defects are entirely eliminated in accordance with the present invention.

Numeral 16 in the drawing is an air inlet, 17 wind pipe and 18 an exhaust fan.

Figure 4:
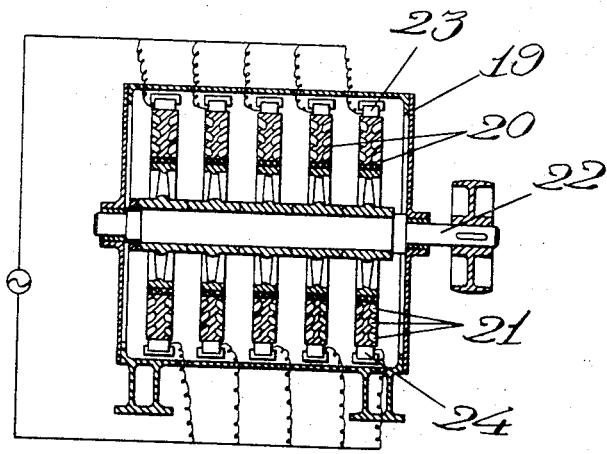
FIG. 4 is a cross-section in side elevation of the grain selector embodying the present invention.
Figure 5:
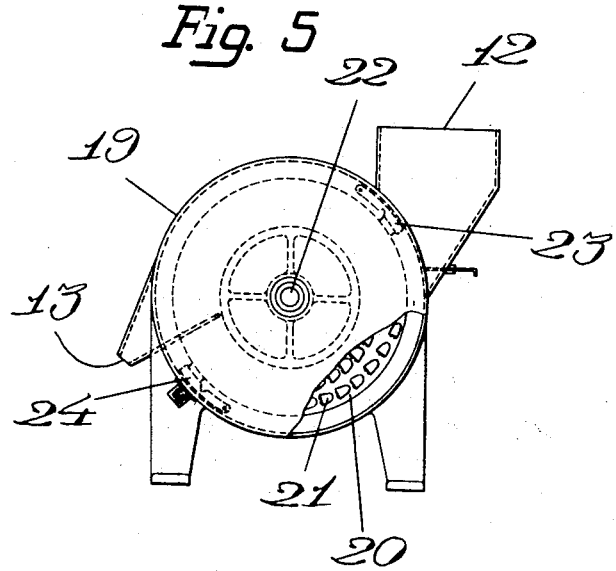
FIG. 5 is a front view thereof, shown partially in section.

In FIGS. 4 and 5, wherein the grain selector embodying the present invention is illustrated, 19 is a grain selector having a number of selector disks and 20 a selector disk made from dielectric material which may be heated by applying the electric current thereto and having selector holes 21. Reference 22 is a man axle, 23 and 24 brush elements for electric circuit and 25 an outer casing for selector disk member.

In operating the grain selector of such structure, the selector disks are heated to a suitable temperature so that hindrance of passage of grains through the holes for selecting the grains due to the holes being stopped by the flour removed from grains, resulting in a poor selection of grains and lowered selecting capacity and efficacy of the grain selector, may not take place.

In FIG. 6 is illustrated a corn transit line embodying the present invention wherein the reference numeral 25 is a flexure of the transit line and 26 a gas burner to heat the inner wall surface to a suitable temperature. The temperature of the inner wall surface of the transit line is maintained at a certain temperature above dew point through heating the wall surface of the flow tube and the grains with affixed bran conveyed inside said tube by the flames of the gas burner so that the bran will not adhere to the inner surface of the transit pipe. It is to be noted that heat source is not limited to the gas burner and the locations of the flow pipe to be heated by the gas burner is not limited to the flexures thereof.

I claim:
1. A method of preventing the adhesion of powdery or granular material to the contacting surfaces of a conveying means through which the materials flow comprising the step of heating the surfaces of the conveying means in contact with the material flowing therethrough to a temperature higher than the dew point of the water content of the flowing material and lower than the temperature at which the material is damaged by the heat.

2. A method, as set forth in claim 1, comprising the step of thermostatically controlling the temperature of the contacting surfaces of the conveying means for keeping the temperature thereof constant.

3. A method, as set forth in claim 1, comprising the step of maintaining the temperature of the contacting surfaces within the conveying means about 15° higher than that of the material flowing therethrough in contact with the surfaces.

4. A method, as set forth in claim 3, comprising the step of thermostatically controlling the temperature of the contacting surfaces of the conveying means for keeping the temperature thereof contsant.

References Cited

UNITED STATES PATENTS

| | | | |
|---|---|---|---|
| 897,782 | 9/1908 | Reilley | 137—341 |
| 2,452,367 | 10/1948 | Gangloff | 137—341X |
| 2,556,557 | 6/1951 | Schweitzer | 137—341 |
| 2,646,065 | 7/1953 | Tyson | 137—341X |
| 2,795,464 | 6/1957 | Richards et al. | 302—49 |
| 2,798,772 | 7/1957 | Redcay | 137—13 |
| 2,806,636 | 9/1957 | Richards | 302—49 |
| 3,050,608 | 8/1962 | De Woody | 137—341X |
| 3,206,254 | 9/1965 | Mylting | 302—49 |

SAMUEL SCOTT, *Primary Examiner.*